Patented Dec. 26, 1939

2,184,720

UNITED STATES PATENT OFFICE 2,184,720

PREPARATION OF VITAMIN B₁ AND ITS ANALOGOUS SUBSTANCES

Taizo Matukawa, Kyoto, and Masaki Ohta, Osaka, Japan, assignors to Kabushiki-Kaisha Takeda Chobei Shoten, Higashi-ku, Osaka, Japan No Drawing. Application October 24, 1938, Serial No. 236,782. In Japan November 1, 1937

1 Claim. (Cl. 260—251)

This invention relates to improvements in preparation of vitamin B₁ and its analogous substances.

Vitamin B₁ is prepared heretofore by either one of the following methods: 2-methyl-4-amino-5-brommethyl-pyrimidine and 4-methyl-5-oxyethyl-thiazol are combined so as to form 4-methyl-5-β-oxyethyl-N-[2'-methyl-4'-amino-pyrimidyl-5'-methyl]-thiazolium - 3 - bromide with subsequent replacement of bromine of the product by chlorine. Or 2-methyl-4-amino-5-thioformaminomethyl-pyrimidine and γ-aceto-γ-brom (or chlor)-propylalcohol-benzoate (or acetate) are combined so as to form 4-methyl-5-β-benzoxy-ethyl (or acetoxyethyl)-N-[2'-methyl-4'-amino-pyrimidyl-5'-methyl]-thiazolium-3-bromide (or chloride) and the bromine in the product molecule is substituted by chlorine, as well as the benzoyl group (or acetyl group) by hydrogen.

The present invention consists of condensing 2-methyl-4-amino-5-thioform or form-aminomethyl-pyrimidine (V) and γ,γ-diaceto-γ-mercapto-propylalcohol (XI) by heating, with a solvent in the presence of hydrochloric acid.

Example

A mixture of 6 gms. γ,γ-diaceto-γ-mercapto-propylalcohol, 5 gms. 2-methyl-4-amino-5-formaminomethyl-pyrimidine, and 5 c. c. glacial acetic acid containing hydrochloric acid is heated on a metal bath at 100–110° C. for 2 hours.

The product is then extracted with ether to remove ether-soluble substances and the residue is dissolved in 100 c. c. absolute alcohol, to which a small amount of hydrochloric acid is added. The alcoholic solution separates out crystals of vitamin B₁ when it is heated for a short time or when set aside for about 12 hours. The crystals are filtered and purified by recrystallisation from alcohol. Yield is 4 grams and the melting point of the product is 245° C.

The chemical reaction is represented by the following equation:

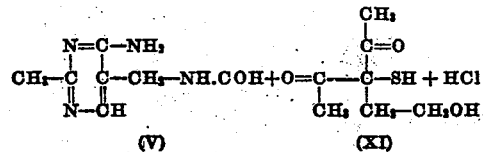

The starting material, 2-methyl-4-amino-5-formaminomethyl-pyrimidine (V) employed in the example, is prepared in the following manner:

2-methyl-4-amino-5-cyan-pyrimidine (III) is formed by the reaction of aminomethylen malonitrile (I) with acetimid-ether (II). Using a cathode plate coated with platinum or palladium black the product is electrolytically reduced in an acid solution, whereby 2-methyl-4-amino-5-aminomethyl-pyrimidine (IV) is obtained. This compound is reacted with formic acid to obtain 2-methyl-4-amino-5-formaminomethyl - pyrimidine (VI).

These chemical reactions are illustrated by the following equations:

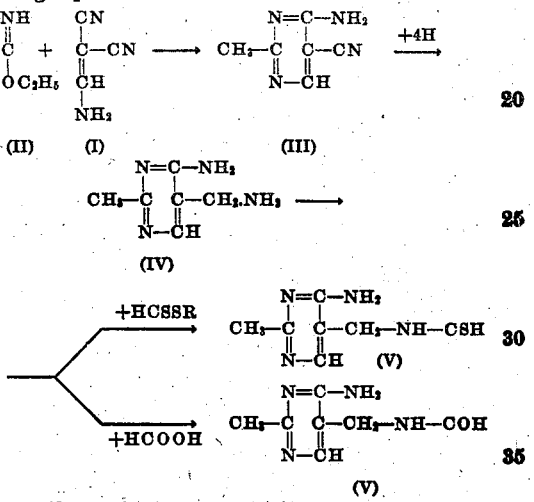

The other starting material, γ,γ-diaceto-γ-mercapto-propylalcohol (XI) is prepared in the following manner:

γ-Aceto-γ-chlor-propylalcohol (VI) is treated with an acetylating agent such as acetic anhydride or acetylchloride, and the product is subjected to fractional distillation. γ,γ-Diaceto-γ-

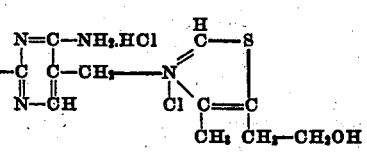

chlor-propylalcohol is distilled at 72–74° C. under a pressure of 2 mm. mercury.

As an alternative method, 1 mol aceto-acetic ester, 2 mols sodium alcoholate and 1 mol ethylene chlorhydrin are reacted to produce α-acetobutylolactone (VII), which in turn is treated with an acetylating agent to obtain α,α-diaceto-butylolactone (VIII). A carboxyl-group of the product is removed by a known process so as to produce γ,γ-diaceto-propylalcohol (IX), which is then chlorinated to obtain γ,γ-diaceto-γ-chlorpropylalcohol (X).

The final product (XI) is obtained by treating this product with potassium hydrosulphide.

These reactions are illustrated by the following equations:

1. 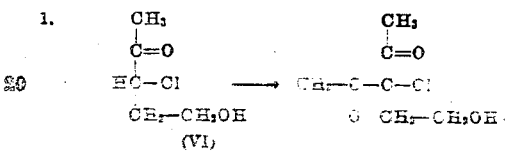

2. 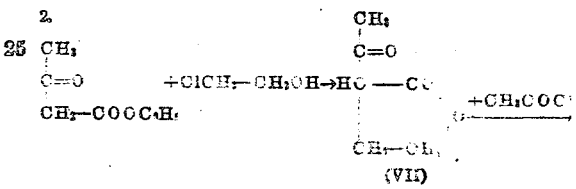

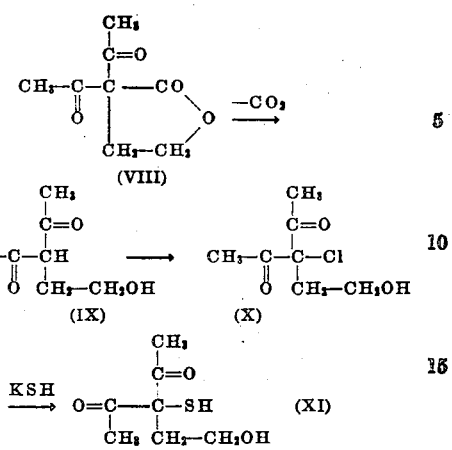

What we claim is:

A process for preparing vitamin B₁ which comprises reacting 2-methyl-4-amino-5-formaminomethyl-pyrimidine with γ,γ-diaceto-γ-mercaptopropylalcohol and glacial acetic acid containing hydrochloric acid.

TAIZO MATUKAWA.
MASAKI OHTA.